Oct. 16, 1962                G. TREISS                3,058,390
SINGLE KNOB INDEXING AND FRAMING MEANS
Filed Oct. 17, 1960

INVENTOR.
GEORGE TREISS
BY
James V. Malone

3,058,390
SINGLE KNOB INDEXING AND FRAMING MEANS
George Treiss, Brentwood, N.Y., assignor to Viewlex, Inc., Long Island City, N.Y.
Filed Oct. 17, 1960, Ser. No. 62,965
1 Claim. (Cl. 88—28)

This invention relates to indexing and framing means for strip film projectors or viewers where the frames are individually indexed and more particularly to such means having a single knob.

In a strip film projector after the film is placed on the driving sprocket it is generally necessary to adjust the framing so that a full frame appears on its screen. Conventional projectors generally provide a separate lever for framing, such as shown in Patent No. 2,534,731.

The present invention has a single knob for both adjusting the framing and indexing the frame. In the normal knob position the frames are indexed by rotating the knob from one detent position to the next. In order to adjust the framing the knob is pulled out and the detent mechanism is locked so that the knob in the pulled-out position can adjust the frame.

More particularly the present invention comprises a knob rotatably mounted in the frame and having an externally threaded sleeve. A sprocket shaft extends through the sleeve and is slotted at the knob end so that the knob is connected to the shaft with a sliding pin connection. A detent sleeve is mounted on the knob sleeve on the inside of the frame and is spring loaded towards the knob. One end of the detent sleeve has indentations equally spaced around its periphery which cooperate with a spring loaded ball mounted in the frame to index the shaft. The other end of the detent sleeve has a plurality of locking tabs and the frame adjacent the tabs has a locking socket so that when the knob is pulled out one of the tabs locks into the frame and permits the knob and shaft to be turned relative the detent sleeve.

Accordingly, a principal object of the invention is to provide new and improved indexing and framing means for strip film projectors.

Another object of the invention is to provide new and improved indexing and framing means for strip film projectors utilizing a single knob.

Another object of the invention is to provide new and improved indexing and framing means for strip film projectors utilizing a single knob so that the indexing and framing may be performed with one hand.

Another object of the invention is to provide new and improved indexing and framing means for strip film projectors having means to lock the detent mechanism so that the frame of the film may be adjusted.

These and other objects of the invention will be apparent from the following specification and drawings of which:

Figure 2:
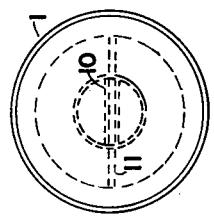
FIGS. 2 and 3 are detail views of the embodiment of FIG. 1.

Referring to the figures the invention generally comprises a knob 1 having a sleeve portion which is externally threaded at the end 2. The knob is rotatably mounted in the frame F of the projector. The sprocket shaft 3 is mounted inside the sleeve 2 of the knob member at one end and rotatably mounted in the frame F at its other end. The shaft is positioned relative the frame by means of the second knob 4 and a collar 5. A sprocket 6 is mounted on the shaft and adapted for engagement with conventional strip film. At the knob 1 end the shaft 3 has a slot 10 which engages a pin 11 through the knob member 1. A detent member or sleeve 7 is mounted on the sleeve of the knob member and is normally spring loaded against the snap ring 8 on knob 1 by means of washer 12, spring washer 13 and nut 14 which is threaded on the externally threaded end 2 of the knob member 1.

Figure 3:
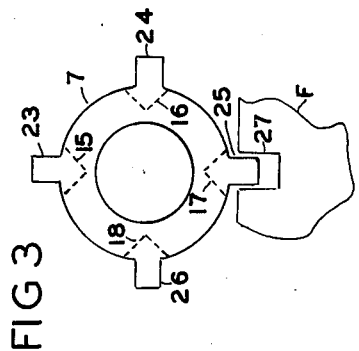

Referring to FIG. 3 the detent member 7 at the knob end has four indentations 15, 16, 17 and 18 spaced 90° apart which are adapted to engage a spring loaded ball 20 which is mounted in a shaftway 21 in a frame F and which is spring loaded up by means of the spring 22.

At the other end of the detent 7 are four locking tabs 23, 24, 25, 26 which are adapted to engage the locking channel or socket 27 in frame F which is generally shaped like the locking tabs, being slightly larger to accommodate one of them. In the normal position shown, the detent member 7 is pressed against the snap ring 8 and knob member 1 by means of the nut 14 which is tightened with sufficient force so that when the knob is rotated in the illutsrated position, the entire assembly including the knob member 1 and detent member 7 rotate as a unit. In practice the knob will be rotated one detent position or 90°, which corresponds to one frame distance on the film. If the film is of the double frame type the knob may be rotated two positions.

Figure 1:
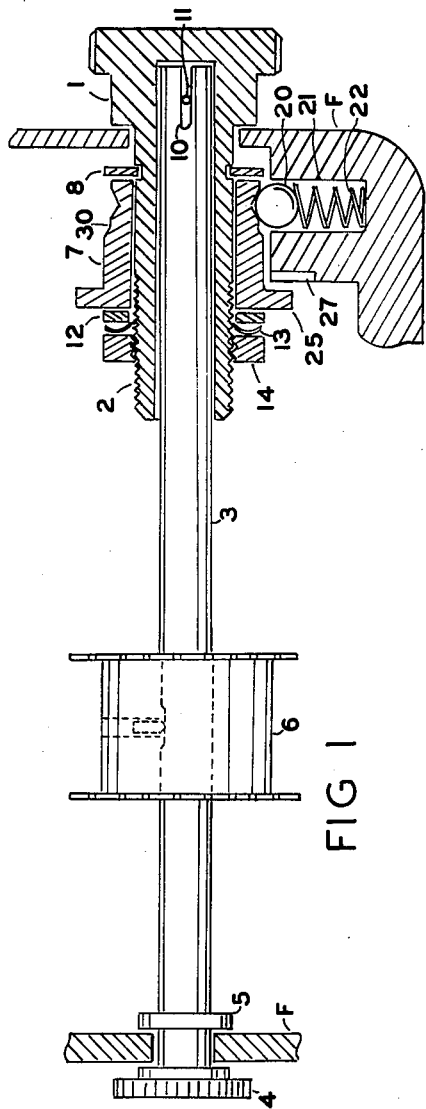
FIG. 1 shows an elevation sectional view of an embodiment of the invention.

In order to adjust the framing, the knob 1 is pulled out. This causes one of the locking tabs on the member 7 to be engaged in the locking socket 27 in the frame. However, the knob remains engaged with the shaft 3 because the pin 11 slides in the slot 10. Note the tabs are in the same angular position as the detent indentations in the member 7, so that locking should be automatic. However, if necessary slight turning will engage the lock 27. With the knob 1 in the pulled-out position it is then rotated to adjust the framing. However, the detent member 7 being locked remains stationary. After the framing is adjusted, when the knob is released it will snap back into the normal indexing position shown in FIG. 1 by cam action of spring loaded ball 20. Bevelled shoulder 30 bears against ball 20 when knob is pulled out. This keeps knob under spring loading to automatically return the knob to normal position. The sprocket may also be indexed by means of the knob 4 on the other end of the shaft 3.

Many modifications may be made by those who desire to practice the invention without departing from the scope thereof which is defined by the following claim.

I claim:

In a stripfilm projector of the type having a frame and a shaft mounted sprocket; single knob film framing and indexing means comprising a knob rotatably mounted in said frame, said knob having an externally threaded sleeve, a sprocket shaft having one end mounted in said sleeve, said shaft having a slot at said one end, a pin connected through said knob and said slot, a detent sleeve mounted on said knob sleeve, said detent sleeve having detent indentations equally spaced around its periphery at one end and having locking tabs equally spaced around its periphery at its other end, means to axially spring load said detent sleeve against said knob, a spring loaded ball mounted in said frame and adapted to enter said detent indentations, and a locking socket in said frame adapted to engage one of said locking tabs, said knob and detent sleeve being slidably mounted to move in and out along the axis of said knob a sufficient distance to engage one of said locking tabs in said locking socket, whereby when said knob is turned in normal position a film on said sprocket may be indexed one position by said detent means but when said knob is pulled out said detent sleeve will lock one of said locking tabs in said locking socket so that said knob and sprocket may be rotated relative said detent sleeve and the frame of said film may be adjusted.

References Cited in the file of this patent

UNITED STATES PATENTS

| | | |
|---|---|---|
| 2,543,656 | Bradford et al. | Feb. 27, 1957 |
| 2,803,993 | Herrmann et al. | Aug. 27, 1957 |

FOREIGN PATENTS

| | | |
|---|---|---|
| 649,787 | Great Britain | Jan. 31, 1951 |